United States Patent Office

3,076,757
Patented Feb. 5, 1963

3,076,757
PARAFFIN CONTROL COMPOSITION
AND METHOD
John A. Knox, Aleck B. Featherston, and Reginald M. Lasater, Duncan, Okla., assignors to Halliburton Company, Duncan, Okla., a corporation of Delaware
No Drawing. Filed Sept. 15, 1960, Ser. No. 56,110
8 Claims. (Cl. 252—8.3)

This invention relates to compositions and methods useful in controlling paraffin or paraffin-forming and similar substances, such as by reducing or preventing the deposition, formation or accumulation of paraffin on the surfaces of pipes and other apparatus containing flow passageways through which fluid containing paraffin or paraffin-forming substances is conducted.

It is anticipated that the invention will be widely applied in connection with oil and gas well operations. For example, the composition and method of the invention may be employed in treating operations performed to stimulate or increase production from an underground oil-bearing zone formation. The treatment may reduce or prevent the deposition, formation or accumulation of paraffin in flow passageways located in the well and/or in related equipment at the surface of the ground.

While various proposals have heretofore been made for controlling or reducing objectionable paraffin deposits, these have commonly involved using a treating agent which functions to reduce the tendency of the liquid produced from the well to give up or lose its paraffin and paraffin-forming substances, without appreciably affecting the structure or equipment itself or the surfaces thereof past which the liquid is conducted and onto which the paraffin has a tendency to be collected.

For example, one of the practices of the prior art has been to pour oil-soluble naphthalene crystals in the annulus of an oil-producing well wherein objectionable quantities of paraffin have been noticed. The naphthalene settles to the bottom of the well and is dissolved in and produced back with the oil from the producing zone or formation. Where trouble has been encountered due to paraffin in the flow line to the tank battery, naphthalene has been put directly into the line by some mechanical device. It has been found that regularly timed, successive treatments may be employed to keep the paraffin from accumulating to an undesirable extent.

More recently, improved paraffin control compositions of the foregoing type have been developed, including the use of mixtures of naphthalene with less readily oil-soluble substances, particularly beta naphthol or anthracene. See the co-pending United States patent application, Serial No. 844,624, which was filed on October 6, 1959, jointly by Paul L. Skolaut and Almon B. Waters and is assigned to the same assignee as is the present application.

As indicated above, the foregoing practices of the prior art have proven generally successful, but it has now been discovered that the deposition or accumulation of paraffin on structures and equipment can be reduced or prevented by using a treating agent which is relatively insoluble in and non-reactive with the oil in the liquid being produced from the well, but which functions to actually treat the structure or equipment itself having surfaces past which the produced liquid is conducted.

Accordingly, one object of the present invention is to provide an improved paraffin control composition and an improved method using the same in treating structures and equipment having surfaces past which liquid containing paraffin or paraffin-forming substances is conducted.

The foregoing and additional objects and advantages are attained, in accordance with the invention, by utilized a paraffin control agent which is relatively insoluble in oil but is soluble, preferably at a very slow rate, in the water which is commonly present and produced with the oil or which is otherwise conducted past the surfaces of the structure or equipment to be treated.

In a preferred way of proceeding, the structure and equipment in and related to a producing well is treated by introducing into the well a complex phosphate which is slowly soluble in water. For example, the complex phosphate may be a slowly soluble phosphate glass, such as sodium phosphate glass. A preferred material is a bimetallic phosphate such as sodium calcium polyphosphate, which is relatively very slowly soluble, but other polyphosphates with slow rates of dissolution in water may be employed to particular advantage in certain applications. Where high temperatures (for example, above about 180° Fahrenheit) are likely to be encountered, the trimetallic phosphates, such as a sodium magnesium calcium glassy phosphate, may be used to advantage.

While the invention is not limited to any particular theory of behavior, it is believed that the complex phosphate material, after being introduced into the well, becomes slowly dissolved in the water which is commonly present in the fluid produced from wells wherein paraffin problems are most likely to be encountered. It is believed that the ions of the resulting solution react with substances in or become adsorbed on the structure or equipment having surfaces past which the well fluid containing the dissolved phosphate material is conducted. These surfaces are thus rendered less likely to collect or accumulate paraffin and the treatment of the surfaces is continuously renewed during the period while the phosphate material is being continuously dissolved in the water produced by the well.

With regard to the length of this period, it is pointed out that oil wells which produce relatively large amounts of water with the oil appear to present less of a paraffin control problem, due to there being less likelihood of paraffin being deposited in objectionable amounts in those wells than in wells wherein relatively less water is produced with the oil. Thus, there is less likelihood of excess water being present in the most troublesome wells. As a result, there is less likelihood of the rate of dissolution of the phosphate material being unduly increased in those wells wherein there is the greatest need for prolonged paraffin control treatments.

While the particle sizes of the phosphate material are not believed critical, it is believed that maximum benefits will be obtained where the particle sizes are large enough so that the relatively slow rate of dissolution of the material, considering the prevailing conditions of temperature and other factors, is not unduly increased as a result of the material being used in particulated form. Of course, considering the manner of application of the treatment, as well as the particular conditions encountered in the well being treated, it will ordinarily be desirable or necessary to employ particle sizes which are convenient to handle and place at the point of treatment. For most wells, it is believed that satisfactory results will be obtained using particles ranging in size from those capable of passing a standard 200 mesh sieve up to as large as may be conveniently handled, using the equipment available at the well. Particles ranging in size from 10 to 40 mesh will, it is believed, find wide usage.

The amount of paraffin control material needed to treat a particular well will, of course, depend upon several factors, not the least of which will be the extent to which paraffin has been a problem in the area. In general, it is believed that more than about 300 pounds of the paraffin control material will not be needed per treatment. However, it is understood that more or less than this amount may be needed for best results in particular wells. It is understood, also, that the frequency of repetition of the treatment will depend to a large extent on the amount of phosphate material used during each treatment, with larger quantities generally resulting in less frequent treatments.

In carrying out a treating operation, any of various procedures may be followed. If desired, the phosphate material may be dumped in the well, with or without the use of bailers or the like to facilitate placement thereof at the desired location. In many instances, it will be desirable to prepare a slurry of the phosphate material in a carrying fluid or liquid, such as oil or water, and to pump or otherwise force the slurry into the well. If desired, other treating agents may be included with the phosphate material, but care should be taken so as not to include chemicals which will be incompatible.

While the invention has been described herein with particular reference to certain details and special embodiments thereof, it is understood that these are by way of example, the scope of the invention being best defined in the appended claims.

What is claimed is:

1. A method of inhibiting the formation of paraffin on surfaces past which oil is conducted, comprising the step of: contacting said surfaces with an aqueous solution containing a quantity of slowly soluble polyphosphates selected from the group consisting of alkali metal polyphosphates, alkali metal alkaline earth metal polyphosphates, and alkali metal calcium magnesium polyphosphates.

2. A method of inhibiting the formation of paraffin on surfaces past which oil is conducted, comprising the step of: contacting said surfaces with an aqueous solution containing a quantity of slowly soluble sodium polyphosphate.

3. A method of inhibiting the formation of paraffin on surfaces past which oil is conducted, comprising the step of: contacting said surfaces with an aqueous solution containing a quantity of slowly soluble sodium calcium polyphosphate.

4. A method of inhibiting the formation of paraffin on surfaces past which oil is conducted, comprising the step of: contacting said surfaces with an aqueous solution containing a quantity of slowly soluble sodium calcium magnesium polyphosphate.

5. In a process of producing oil from a well, the method of reducing the tendency of paraffin and like substances to collect on surfaces past which the oil is conducted, comprising the step of: introducing into the well a quantity of a low-solubility polyphosphate selected from the group consisting of alkali metal polyphosphates, alkali metal alkaline earth metal polyphosphates, and alkali metal calcium magnesium polyphosphates, which polyphosphate is slowly soluble in water produced with the oil.

6. In a process of producing oil from a well, the method of reducing the tendency of paraffin and like substances to collect on surfaces past which the oil is conducted, comprising the step of: introducing into the well a quantity of a low-solubility sodium phosphate glass which is slowly soluble in water produced with the oil.

7. In a process of producing oil from a well, the method of reducing the tendency of paraffin and like substances to collect on surfaces past which the oil is conducted, comprising the step of: introducing into the well a quantity of a low-solubility sodium calcium polyphosphate which is slowly soluble in water produced with the oil.

8. In a process of producing oil from a well, the method of reducing the tendency of paraffin and like substances to collect on surfaces past which the oil is conducted, comprising the step of: introducing into the well a quantity of a low-solubility sodium magnesium calcium glassy polyphosphate which is slowly soluble in water produced with the oil.

References Cited in the file of this patent

UNITED STATES PATENTS

| | | |
|---|---|---|
| 2,294,877 | Wayne | Sept. 1, 1942 |
| 2,365,489 | Partridge | Dec. 19, 1944 |
| 2,580,765 | Hall et al. | Jan. 1, 1952 |
| 2,602,778 | Snyder et al. | July 8, 1952 |
| 2,836,559 | Bock et al. | May 27, 1958 |
| 2,873,253 | Stanphill | Feb. 10, 1959 |

OTHER REFERENCES

Beeson: Well Completion Practices, article in World Oil, January 1950, pp. 88 to 90.